United States Patent
White (10) Patent No.: US 11,240,078 B1
(45) Date of Patent: Feb. 1, 2022

(54) FREQUENCY SHIFT KEYING MODULATOR, TRANSMITTER AND LINK

(71) Applicant: HRL Laboratories, LLC, Malibu, CA (US)

(72) Inventor: Carson White, Agoura Hills, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 17/139,916

(22) Filed: Dec. 31, 2020

Related U.S. Application Data (60) Provisional application No. 63/013,357, filed on Apr. 21, 2020.

(51) Int. Cl.
| | |
|---|---|
| *H03C 3/00* | (2006.01) |
| *H03K 7/06* | (2006.01) |
| *H04L 27/12* | (2006.01) |
| *H04L 5/00* | (2006.01) |

(52) U.S. Cl.
CPC ............ *H04L 27/12* (2013.01); *H04L 5/0039* (2013.01)

(58) Field of Classification Search
CPC .............................. H04L 27/12; H04L 5/0039
USPC ........................................................ 375/303
See application file for complete search history.

(56) References Cited

U.S. PATENT DOCUMENTS

| | | | | |
|---|---|---|---|---|
| 2009/0022079 A1* | 1/2009 | Zhou | ................. | H03M 13/2792 370/312 |
| 2009/0096543 A1* | 4/2009 | El-Agha | ................. | H04L 27/12 332/101 |
| 2016/0021662 A1* | 1/2016 | Chen | ......................... | H03J 7/04 370/329 |
| 2019/0097680 A1* | 3/2019 | O'Brien | ............. | H04B 10/5563 |
| 2020/0295849 A1* | 9/2020 | Li | ........................... | E21B 47/12 |

OTHER PUBLICATIONS

Charles-Ugo Piat-Durozoi, Charly Poulliat, Marie-Laure Boucheret, Nathalie Thomas, Emmanuel Bouisson, Guy Lesthievent, Multisymbol with memory noncoherent detection of CPFSK, CNES, University of Toulouse, INPT/IRIT, TeSA—Toulouse, France, 2017 (Year: 2017).*

Gamble, J.T., "Wideband coherent communication at VLF with the experimental transmitting antenna modulator," RADC-TR-73-287, 1973.

(Continued)

*Primary Examiner* — Tanmay K Shah
(74) *Attorney, Agent, or Firm* — Ladas & Parry (57) ABSTRACT

A Continuous Phase Frequency Shift Keying modulator provided to receive a series of binary symbols having a predetermined repetition period, and generate a series of sinusoidal signals comprising in sequence: a first sinusoidal signal with a first frequency in response to each received binary symbol having a first binary value; and a second sinusoidal signal with a second frequency in response to a received binary symbol having a second binary value, where the lowest of the first and second frequencies is larger than or equal to a third of the symbol rate; wherein the sinusoidal signals are shortened or lengthened with respect to the binary symbol they respond to, such that each first sinusoidal signal comprises an integer number of half periods of said first frequency and each second sinusoidal signal comprises an integer number of half periods of said second frequency.

20 Claims, 11 Drawing Sheets

(56) References Cited

OTHER PUBLICATIONS

Schab, K. et al., "Pulse characteristics of a direct antenna modulation transmitter," IEEE Access, vol. 7, Feb. 28, 2019 (7 pages).
Wolff, H., "High-speed frequency-shift keying of LF and VLF radio circuits," by , IRE Transactions of Communication Systems, vol. 5, No. 3, Dec. 1957, pp. 29-42.

* cited by examiner

$m = 1, f_b = \frac{f_0}{1}$

| | corr_pos | corr_neg | corr_diff | data_RX | data_TX |
|---|---|---|---|---|---|
| | 9.8664e-08 | 0.99998 | -0.99998 | -1 | -1 |
| | 0.99982 | 8.8564e-07 | 0.99982 | 1 | 1 |
| | 9.8664e-08 | 0.99998 | -0.99998 | -1 | -1 |
| | 0.99982 | 8.8564e-07 | 0.99982 | 1 | 1 |
| | 9.8664e-08 | 0.99998 | -0.99998 | -1 | -1 |

Even though few cycles, symbols perfectly orthogonal $m = 1, f_b = \frac{f_0}{1.25}$

| | corr_pos | corr_neg | corr_diff | data_RX | data_TX |
|---|---|---|---|---|---|
| | 0.016092 | 1.0448 | -1.0287 | -1 | -1 |
| | 0.6868 | 0.080511 | 0.60629 | 1 | 1 |
| | 0.014535 | 1.3674 | -1.3529 | -1 | -1 |
| | 0.98377 | 0.00043771 | 0.98333 | 1 | 1 |
| | 0.039236 | 0.8133 | -0.77406 | -1 | -1 |

Approximation degrades correlation difference when symbol modified large percentage $m = 1, f_b = \frac{f_0}{1.75}$

| | corr_pos | corr_neg | corr_diff | data_RX | data_TX |
|---|---|---|---|---|---|
| | 0.008203 | 1.0161 | -1.0079 | -1 | -1 |
| | 1.0335 | 0.0066742 | 1.0268 | 1 | 1 |
| | 0.0069977 | 0.82714 | -0.82014 | -1 | -1 |
| | 0.98226 | 0.0083331 | 0.97393 | 1 | 1 |
| | 0.008203 | 1.0161 | -1.0079 | -1 | -1 |

As symbol period increases, error from this approximation becomes smaller and correlation improves $m = 1, f_b = \frac{f_0}{10.25}$

| | corr_pos | corr_neg | corr_diff | data_RX | data_TX |
|---|---|---|---|---|---|
| | 0.00023866 | 1.0003 | -1 | -1 | -1 |
| | 1.0033 | 0.00019869 | 1.0031 | 1 | 1 |
| | 0.00027698 | 0.99313 | -0.99285 | -1 | -1 |
| | 0.99633 | 0.0024246 | 0.99608 | 1 | 1 |
| | 0.00023866 | 1.0003 | -1 | -1 | -1 |

By the time we're at 1/10th the center frequency, correlation error becomes negligible

FREQUENCY SHIFT KEYING MODULATOR, TRANSMITTER AND LINK

CROSS-REFERENCE TO RELATED APPLICATIONS

The present application claims priority to and the benefit of U.S. Provisional Application No. 63/013,357, filed Apr. 21, 2020, entitled "FREQUENCY SHIFT KEYING MODULATOR, TRANSMITTER AND LINK", the entire content of which is incorporated herein by reference.

STATEMENT REGARDING FEDERALLY SPONSORED RESEARCH OR DEVELOPMENT

This invention was made with Government support under Contract #N6523620C8013 awarded by the United States Navy. The Government has certain rights in the invention.

TECHNICAL FIELD

Embodiments of the present disclosure relate to Continuous Phase Frequency Shift Keying Direct Antenna Modulation emitter or receiver, as well as methods of operating thereof.

BACKGROUND

At the low end of the RF communications spectrum, antennas are electrically small and have high quality factor (Q). Conventional passive impedance matching schemes lead to either narrow bandwidth (i.e. low data rate) or extremely poor efficiency (i.e. low radiated power). A technical solution for practically using small antennas with a Frequency Shift Keying (FSK) modulation scheme comprises coupling a time varying matching network to the antennas, for example a Direct Antenna Modulation (DAM) circuit. DAM effectively enables efficient radiation of high data rate signals through high-Q electrically small antennas. DAM schemes rely on accurate fast switching to switch reactive components in and out of an antenna matching network at the zero crossings of the RF signal such that energy is not dissipated and damaging transients do not occur. However, the requirement to switch at the zero crossings of the signal imposes restrictions on the relationship between carrier frequency, data rate and modulation index, that may be incompatible with conventional communication system specifications. There exists a need for a structure allowing to use electrically small antennas with high Q at arbitrary frequency, data rate and modulation index.

SUMMARY

This invention is directly applicable to LF, VLF and ULF communication systems. This invention removes the above restrictions of known DAM schemes or circuits to enable the benefits of DAM for FSK at arbitrary frequency, data rate and modulation index. The features and advantages of the present disclosure will be more readily understood and apparent from the following detailed description, which should be read in conjunction with the accompanying drawings, and from the claims which are appended to the end of the detailed description.

An exemplary embodiment of this presentation comprises a modulator in a radio transmitter that generates Continuous Phase Frequency Shift Keying (CPFSK) with the further feature that the instantaneous frequency always changes substantially at the zero crossings of the RF waveform. CPFSK means that a binary bit stream is modulated onto a radio-frequency (RF) carrier such that a logical one and a logical zero shift the frequency by unique factors (e.g. up and down, respectively), with the further feature that the RF waveform is continuous.

In conventional CPFSK, the frequency changes according to the data at periodic intervals (e.g. when the data change); therefore, the phase of the signal can be any value when the frequency changes. According to embodiments of this presentation, the modulation is fixed to change after an integer number of half-cycles of the RF waveform, such that the frequency always changes at zero crossings of the signal. This is for example accomplished by adding an offset to the time at which the frequency changes. This offset will be less than a half cycle of the RF waveform.

Exemplary embodiments of this presentation comprise a modulator, which can be implemented with digital signal processing, and a digital to analog converter. In exemplary embodiment, the modulator performs direct digital synthesis of the RF waveform. In older heterodyne systems, the radio would generate a baseband signal that would drive an analog modulator to create an intermediate frequency (IF) signal, which then would be converted to radio frequency (RF) with a mixer. According to embodiments of this presentation, digital circuits can directly generate modulated IF waveforms. If the frequency is low enough (for example at the frequencies described hereabove) it is possible to directly generate the RF waveform in digital form with a DSP and then convert them to analog with a D/A converter.

Exemplary embodiments of this presentation comprise a transmitter having a modulator as well as a time-varying matching network, such as for direct antenna modulation, and optionally an antenna. Embodiments can also comprise an amplifier, for example coupled to the modulator.

Exemplary embodiments of this presentation comprise a communications link having a transmitter with modulator, a time varying matching network and an antenna, as well as a receiver that can be a non-coherent/incoherent FSK receiver.

An exemplary embodiment of the present disclosure comprises a CPFSK modulator where, given an arbitrary frequency, bitrate and modulation index, the frequency shift from one symbol to another is delayed or advanced by an amount such that the shift occurs at a zero-crossing of the RF waveform.

According to an embodiment of this presentation, the end of the time period of each frequency-modulated symbol (which is also the beginning of the next symbol) is rounded to the nearest half-cycle of the RF waveform to the conventional bit period.

According to an embodiment of this presentation, the modulator comprises a digital signal processing (DSP) component.

According to an embodiment of this presentation, the modulator comprises a DSP component that directly synthesizes the RF waveform/series of frequency-modulated symbols.

Embodiments of this presentation also relate to methods of generating the hereby described frequency-modulated symbols.

An embodiment of this presentation also relates to a transmitter comprising the CPFSK modulator as hereby described, an amplifier, a matching network and an antenna.

According to an embodiment of this presentation, the matching network is time varying in synchronism to the modulated RF signal.

According to an embodiment of this presentation, the matching network switches a reactive component in and out of the system at the zero crossings of the signal in order to resonate the antenna at the FSK frequency being transmitted instantaneously.

According to an embodiment of this presentation, the antenna is an electrically small monopole or dipole and the reactive element is an inductor.

According to an embodiment of this presentation, the matching network includes a main inductor to resonate the antenna at a first higher frequency and a switched inductor to resonate the antenna at a second lower frequency.

According to an embodiment of this presentation, the main inductor and the switched inductor are both variable and can be varied as a function of a carrier frequency and a bit/data rate.

An embodiment of this presentation also relates to a communication system comprising a transmitter as hereby described and a receiver comprising an FSK demodulator.

According to an embodiment of this presentation, the FSK demodulator of the receiver can be an incoherent demodulator.

According to an embodiment of this presentation, a modulator as hereby described can have a modulation index of 1.

According to an embodiment of this presentation, a demodulator as hereby described can comprise correlators.

According to an embodiment of this presentation, a demodulator as hereby described can comprise analog filters.

An embodiment of this presentation relates to a Continuous Phase Frequency Shift Keying modulator comprising an input port configured to receive a series of binary symbols having a predetermined repetition period; a signal processor configured to generate a series of sinusoidal signals comprising in sequence: a first sinusoidal signal with a first frequency in response to each received binary symbol having a first binary value; and a second sinusoidal signal with a second frequency in response to a received binary symbol having a second binary value, where the lowest of the first and second frequencies is larger than or equal to one third the symbol rate; wherein the sinusoidal signals are shortened or lengthened with respect to the binary symbol they respond to, such that each first sinusoidal signal comprises an integer number of half periods of said first frequency and each second sinusoidal signal comprises an integer number of half periods of said second frequency; and an output port configured to output said series of sinusoidal signals. The symbol rate is the inverse of the repetition period. Preferably, the lowest of the first and second frequencies is larger than or equal to one half the symbol rate.

According to an embodiment of this presentation, said series of sinusoidal signals has a same repetition period as said predetermined repetition period.

According to an embodiment of this presentation, each said sinusoidal signal is shortened or lengthened to the half period of the frequency of said sinusoidal signal that makes the duration of said sinusoidal signal closest to said repetition period.

According to an embodiment of this presentation, said series of sinusoidal signals follows the function:

$$s(t) = \sin\left[2\pi\left(f_0 + d_n \frac{m}{2T}\right)[t - (n-1)T - \Delta T_{n-1}] + \varphi_{n-1}\right] \quad (6)$$

where t is time, $f_0$ is a carrier frequency of the sinusoidal signals, $d_n = \pm 1$ depending on whether the $n^{th}$ binary symbol is a 1 or zero, T is the predetermined repetition period, m is a modulation index, $\varphi_{n-1}$ is a phase term that ensures continuous phase in case the sinusoidal signal over the symbol period T has a phase progression that is different than an integer multiple of 2*pi, $\Delta T_{n-1}$ is a duration difference between the sinusoidal signal issued in response to the $(n-1)^{th}$ binary symbol and the predetermined repetition period. According to embodiments of this presentation, in a modulator operating following (6), instead of changing frequencies at periodic times n*T, the frequency changes at n*T+$\Delta T_n$.

According to an embodiment of this presentation, the CPFSK modulator further comprises a controller arranged to generate, on a control port, a control signal synchronous with changes between sinusoidal signals in said series of sinusoidal signals.

An embodiment of this presentation also relates to an transmitter comprising: the CPFSK modulator hereby described, provided to generate said series of sinusoid signals on an output port; a reactive antenna coupled to said output port by a Direct Antenna Modulator, the Direct Antenna Modulator being further connected to the control port and provided to controllably resonate said antenna at said first and second frequencies in synchronism with the output frequency of said CPFSK modulator.

According to an embodiment of this presentation, said antenna is a capacitive antenna.

According to an embodiment of this presentation, said antenna is one of a monopole antenna and a top-loaded monopole antenna.

According to an embodiment of this presentation, said Direct Antenna Modulator comprises a first inductor in series with said antenna and a second inductor, connected in parallel with a control switch, in series with said first inductor.

According to an embodiment of this presentation, the first and second inductors are variable inductors.

An embodiment of this presentation also relates to a communications link comprising a transmitter as detailed above as well as a receiver provided for receiving and demodulating the signals transmitted by the transmitter.

An embodiment of this presentation also relates to a Continuous Phase Frequency Shift Keying modulation method comprising: receiving a series of binary symbols having a predetermined repetition period; and generating a series of sinusoidal signals comprising in sequence: a first sinusoidal signal with a first frequency in response to each received binary symbol having a first binary value; and a second sinusoidal signal with a second frequency in response to a received binary symbol having a second binary value, where the lowest of the first and second frequencies is larger than or equal to a third of the symbol rate; the method comprising shortening or lengthening the sinusoidal signals with respect to the binary symbol they respond to, such that each first sinusoidal signal comprises an integer number of half periods of said first frequency and each second sinusoidal signal comprises an integer number of half periods of said second frequency. Preferably, the lowest of the first and second frequencies is larger than or equal to one half the symbol rate.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Direct Antenna Modulation (DAM) transmitters have demonstrated improved bandwidth for FSK and OOK (On/Off Keying) communications, but must switch at zero crossings. For more details about such schemes, one can for example refer to the document: "Pulse characteristics of a direct antenna modulation transmitter," by K. Schab et al., IEEE Access, vol. 7, Feb. 28, 2019; or to the document "High-speed frequency-shift keying of LF and VLF radio circuits," by H. Wolff, IRE Trans. Commun. Syst., vol. 5, no. 3, Dec. 1957; or to the document "Wideband coherent communication at VLF with the experimental transmitting antenna modulator," by J. T. Gamble; RADC-TR-73-287, 1973. All three articles are hereby incorporated by reference in their entirety.

Improving the symbol/data rate of low frequency communications has been sought after for decades. Furthermore, the DAM technique has been known for decades but has found limited deployment. There has been a missing piece to enable transmission at arbitrary frequency, data rate and modulation index while maintaining high efficiency. Embodiments of this presentation comprise an improved modulation scheme and modulator that operates with DAM to enable transmission at arbitrary frequency, data rate and modulation index while maintaining high efficiency. Embodiments of this presentation also comprise a transmitter using such a modulator, coupled to a DAM time-varying matching network or circuit, and a communication system incorporating said transmitter.

Generally, a FSK modulation scheme/modulator can be described by the function $$s(t) = \sin\left[2\pi\left(f_0 + d_n \frac{m}{2T}\right)[t - (n-1)T] + \varphi_n\right] \quad (1)$$

where t is time, $f_0$ is the carrier frequency, $d_n = \pm 1$ depending on whether the nth bit is a 1 or zero, $T = 1/f_b$ is the bit period (i.e. the inverse of the bitrate), m is the modulation index, and $\varphi_n$ is the phase shift of the nth bit. For coherent receivers (i.e. those that recover the carrier phase), the 0 and 1 symbols are orthogonal for m as small as 0.5. For incoherent receivers (i.e. those that don't recover the carrier phase), the symbols are orthogonal for m as small as 1.0. The modulator can be made to have continuous phase (i.e. CPFSK), according to the prior art, by setting $\varphi_n$ such that the waveform is continuous:

$$\varphi_n = \varphi_{n-1} + 2\pi f_0 T + \pi m d_{n-1} \quad (2)$$

It can be noted at this juncture that a CPFSK scheme/modulator with a modulation index of 0.5 is equivalent to a Minimum Shift Keying (MSK) scheme/modulator.

Generally, a DAM circuit enables the current in a high-Q circuit to be switched to different frequencies at a rate much greater than 1/Q by switching reactive elements in and out. According to embodiments of this presentation, the quality factor Q considered can be the quality factor of the system comprising antenna+matching network+(optionally) amplifier output impedance.

Figure 1:
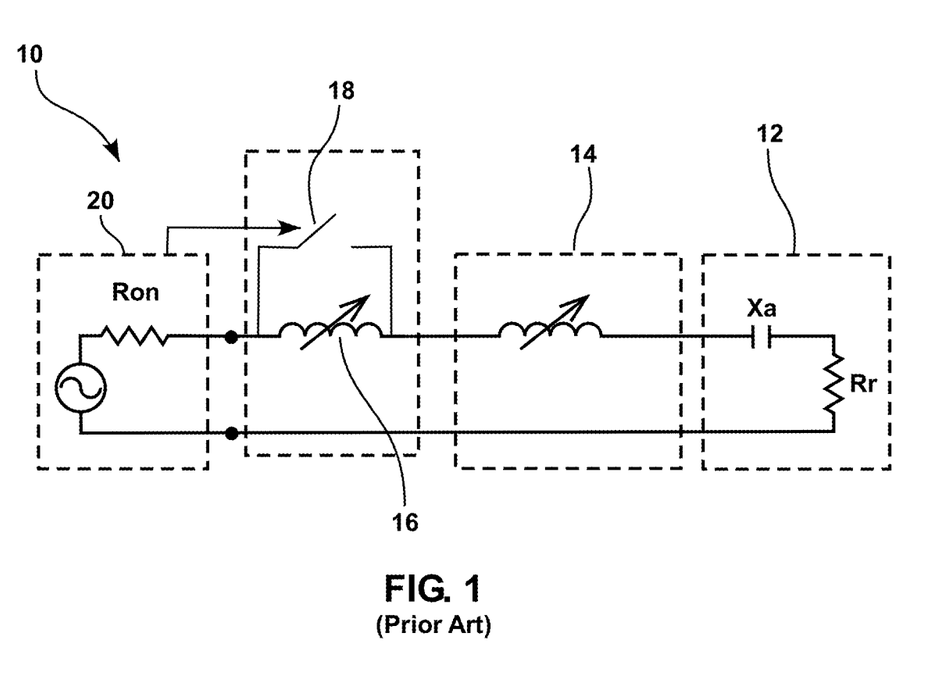
FIG. 1 shows a schematic of a known transmitter incorporating a DAM circuit.

FIG. 1, represents schematically a DAM transmitter 10 comprising a capacitive antenna 12 (e.g. a monopole or top-loaded monopole) provided to be resonated at a first higher frequency by tuning a first series-connected coil 14, preferably a variable inductor. A second coil 16 is provided, such that it is controllably connectable in series with the first coil 14 by means of a shunt switch 18, and such that the series combination of the first coil 14 and the second coil 16 resonates the antenna 12 at a second, lower frequency. A FSK modulator 20 is provided to output a FSK signal comprising consecutive symbols, each symbol comprising a signal oscillating at either the first frequency or the second frequency depending on the symbol representing a first value or a second value. Modulator 20 is provided to control switch 18, thus allowing to shift the resonance frequency of the DAM circuit comprising inductances 14 and 16 between the first and second frequencies. Thus, the resonance frequency of the DAM circuit is switched to follow the frequency output by the modulator 20. Therefore, the transmitter system is always resonant despite transmitting a high data rate well beyond 1/Q of the system.

An important restriction to the circuit above is that the switch 18 must open and close when second coil 16 has little stored energy (i.e. when the instantaneous current is near zero) to avoid dissipating substantial energy and potentially damaging the components. This imposes a restriction on the FSK waveform (1) to only change at the zero crossings. In conventional FSK, this only occurs at select combinations of carrier frequency, bitrate and modulation index. Essentially, the phase of the argument of (1) must progress by an integer multiple of π:

$$2\pi f_0 T \pm \pi m = k\pi \quad (3)$$

This leads to using either discrete center frequencies $$f_0 = \frac{k+m}{2T} \quad (4)$$

or discrete bit rates that are a function of frequency $$f_b = \frac{1}{T} = \frac{2f_0}{k+m} = \frac{f_0}{0.5(k+m)} \quad (5)$$

Figure 2:
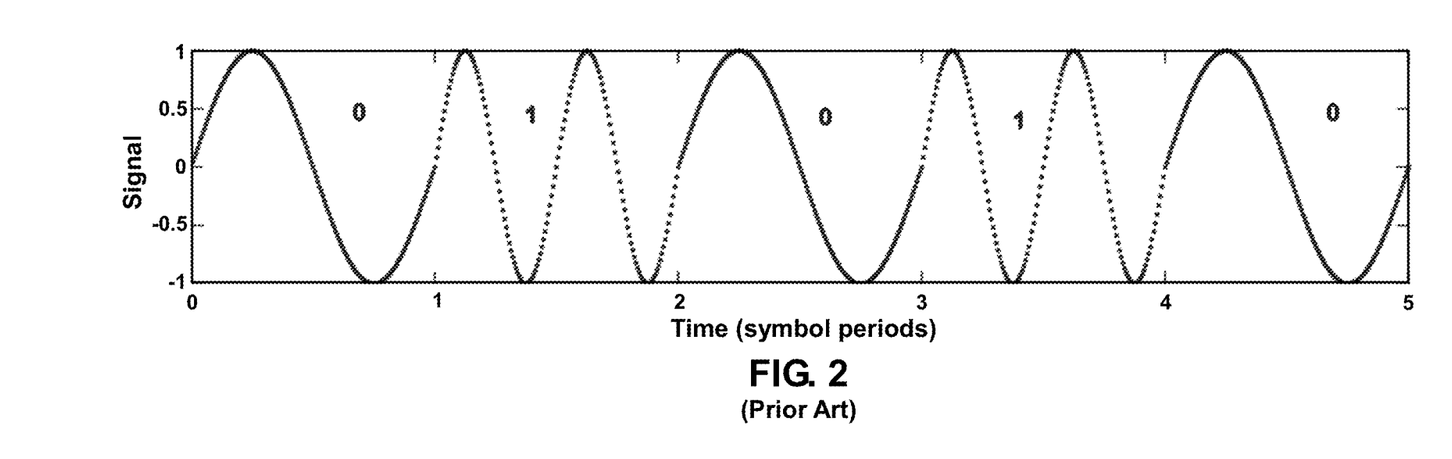
FIGS. 2 and 3 illustrate known CPFSK waveforms.
Figure 3:
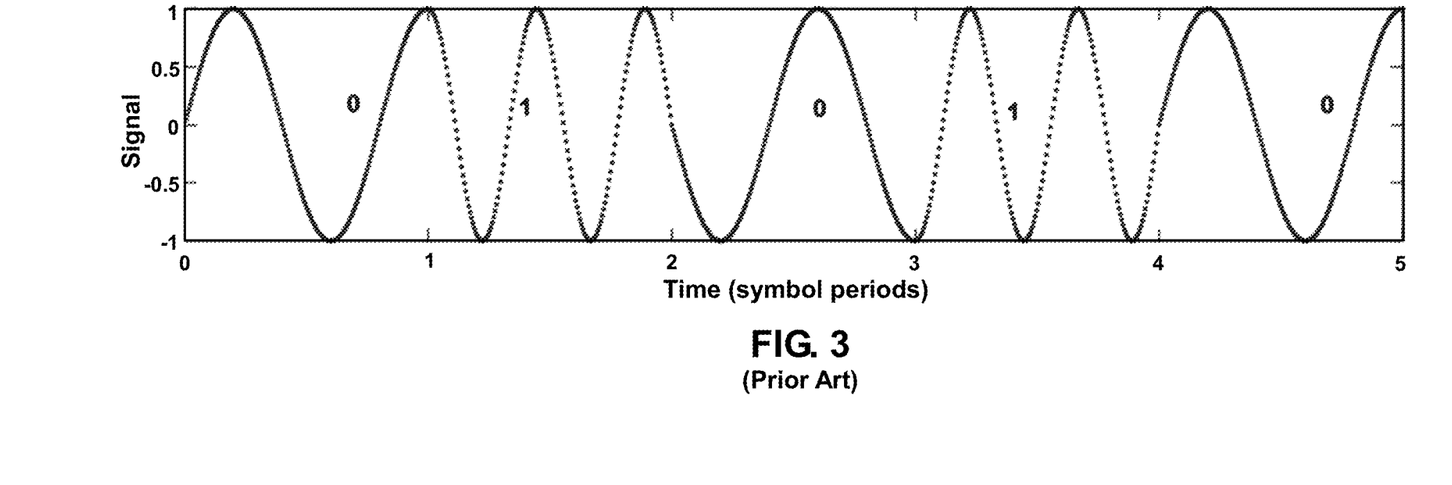

FIGS. 2 and 3 illustrate such known continuous phase FSK operation (with exaggerated high bitrates), where the frequency always change at n*T, where T is the bit period (where each symbol has a length of T). In FIG. 2, when (5) is satisfied, the frequency does change at zero crossings of the RF signal. However, when (5) is not satisfied, as illustrated in FIG. 3, the FSK signal remains continuous but the frequency can change at times where the signal is maximum. The operation illustrated in FIG. 3 would waste the energy stored in coil 16 and potentially cause an arc or other damage. In the operations illustrated in FIGS. 2 and 3, m was 1 and $f_b$ was $f_0/1.75$.

In a CPFSK (Continuous Phase FSK) modulation scheme according to embodiments of this presentation, the signal always changes at zero crossings. The signal can for example be described by $$s(t) = \sin\left[2\pi\left(f_0 + d_n \frac{m}{2T}\right)[t - (n-1)T - \Delta T_{n-1}] + \varphi_{n-1}\right] \quad (6)$$

In the formula above, m/2T is the frequency shift for the FSK waveform. Modulation index m is arbitrary and provides the relationship between data rate and frequency shift. With m=1, the symbols are orthogonal over an integration period of length T. With m=0.5 the symbols are only orthogonal (over an integration period of length T) with a coherent receiver. $\Delta T_{n-1}$ is the extra time it took for the prior symbol to complete its half cycle (the "extra time" can be negative if the previous symbol stopped early, and is positive if the previous symbol stopped late). According to embodiments of this presentation, in a modulator operating following (6), instead of changing frequencies at periodic times n*T, the frequency changes at n*T+$\Delta T_n$. Each symbol n has a starting phase and time offset ($\Delta T_n$) that is carried from the prior symbol (both can be set to zero for the first symbol). The modulator can then determine the number of half-cycles that will occur beginning from the modified nth symbol period until time n*T and round to the nearest integer (alternate embodiments could round up or down). The modulator can then determine the phase progression and time delay to pass to the next symbol. An example for how to calculate the $\Delta T_n$ (dT) and φ (phi) parameters in Matlab is shown hereafter:

% N is the number of symbols to be evaluated
% in a stream, this would be a "while" loop, not a "for" loop
for ctr=1:N+1
 Tmod=1/(f+m*d(ctr)/(2*T));
 if ctr==1
  dTstart(ctr)=0; % how far shifted to the right is the symbol change
  phistart(ctr)=0; % starting phase
 else
  dTstart(ctr)=dT(ctr−1); % how much we're delayed from ctr*T
  phistart(ctr)=phistop(ctr−1); % starting phase (0 or pi)
 end
 NHC(ctr)=round(2*(T-dTstart(ctr))/Tmod);
 % number of half cycles
 Tprime(ctr)=NHC(ctr)*Tmod/2;
 % modified period
 % difference between stop time and ctr*T (pass to next symbol)
 dT(ctr)=Tprime(ctr)−(T−dTstart(ctr));
 % ending phase (0 or pi, pass to next symbol)
 phistop(ctr)=phistart(ctr)+pi*mod(NHC(ctr),2);
end where phistart is $\varphi_{n-1}$, ctr is n, and dTstart is $\Delta T_{n-1}$.

Figure 4:
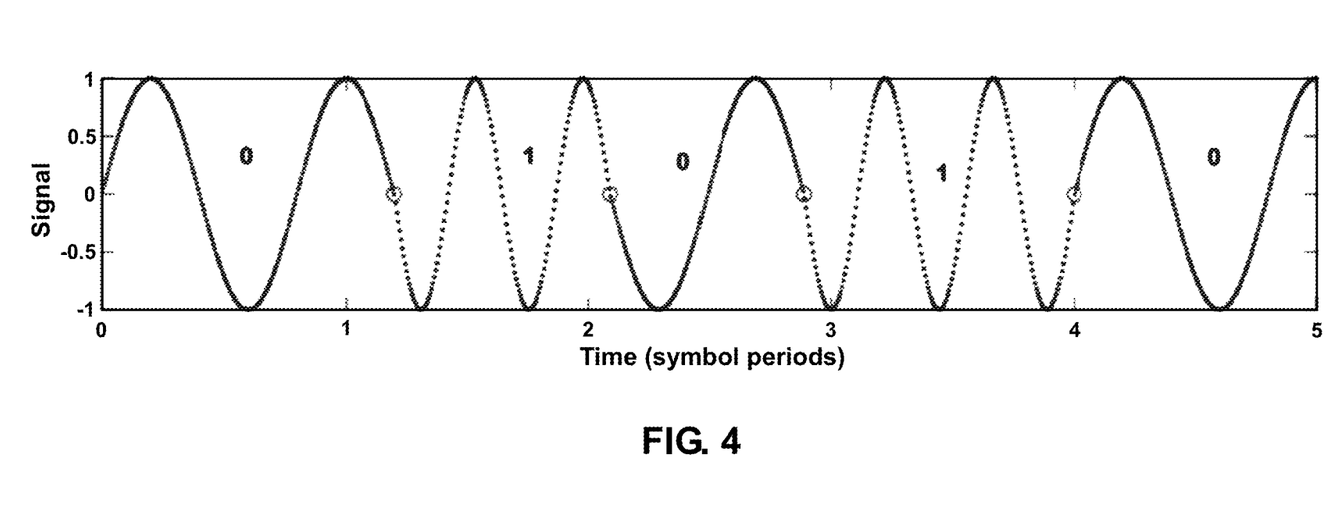
FIG. 4 illustrates a CPFSK waveform according to this presentation.

FIG. 4 illustrates a CPFSK waveform from a modulator/scheme according to embodiments of this presentation where the frequency changes are delayed or advanced to enforce occurrence at zero crossings, for example as defined in (6). In FIG. 4, m was 1 and $f_b$ was $f_0/1.75$. As illustrated and best seen compared to FIG. 3, the frequency changes at the zero crossings but now such frequency changes occur at time offsets that can be positive or negative with respect to the bitrate period.

Figure 5:
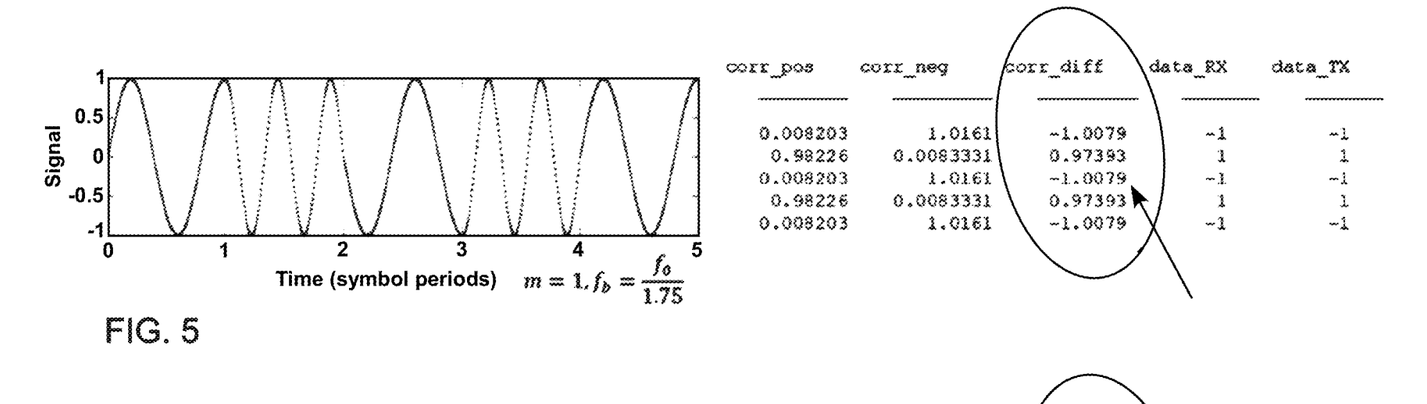
FIGS. 5 and 6 show a comparison of correlation in prior art CPFSK and CPFSK according to this presentation with an incoherent receiver.
Figure 6:
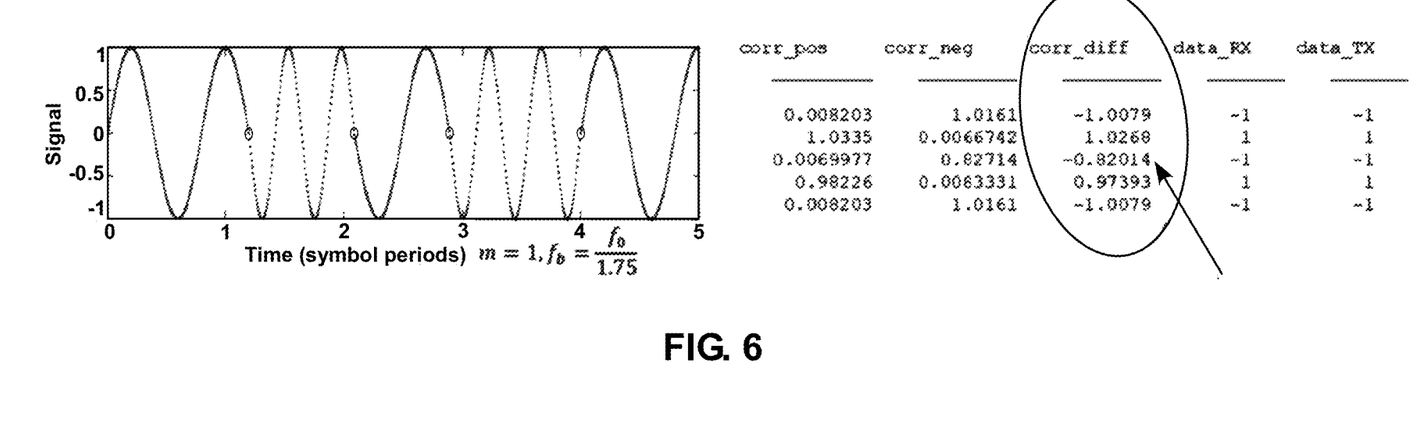

An incoherent correlation receiver was simulated in Matlab for a known CPFSK scheme (FIG. 5) and for a CPFSK scheme according to this presentation (FIG. 6). According to this exemplary embodiment, the signal was correlated over the symbol periods n*T with in-phase and quadrature reference signals of each frequency to determine the correlation with the high and low frequencies (corr_pos and corr_neg), and then the correlation values were subtracted to extract the encoded data (corr_diff, ideally this gives ±1, see Sklar reference). The data was extracted as the sign of the correlation difference (The demodulator performs a "sign" operation on the number corr_diff to determine if the data bit "d" is either a 1 or a −1. This is needed because d is a binary symbol whereas corr_diff is a signed floating point number). A modulation index m=1 was used, which gives orthogonal symbols. As shown in FIG. 5, the prior art CPFSK gives values very close to ideal, as expected. Correlation is desirable, but the signal shown in FIG. 5 is incompatible with the intended transmitter for reasons described above. The signal in FIG. 6 is compatible with the intended transmitter. As shown in FIG. 6, the correlation of the new CPFSK scheme is also strong but it gets degraded when the symbol period becomes <T (e.g. the 3rd symbol in this example, with a correlation difference of −0.82014 against −1.0079 for the prior art CPFSK).

Figure 7:
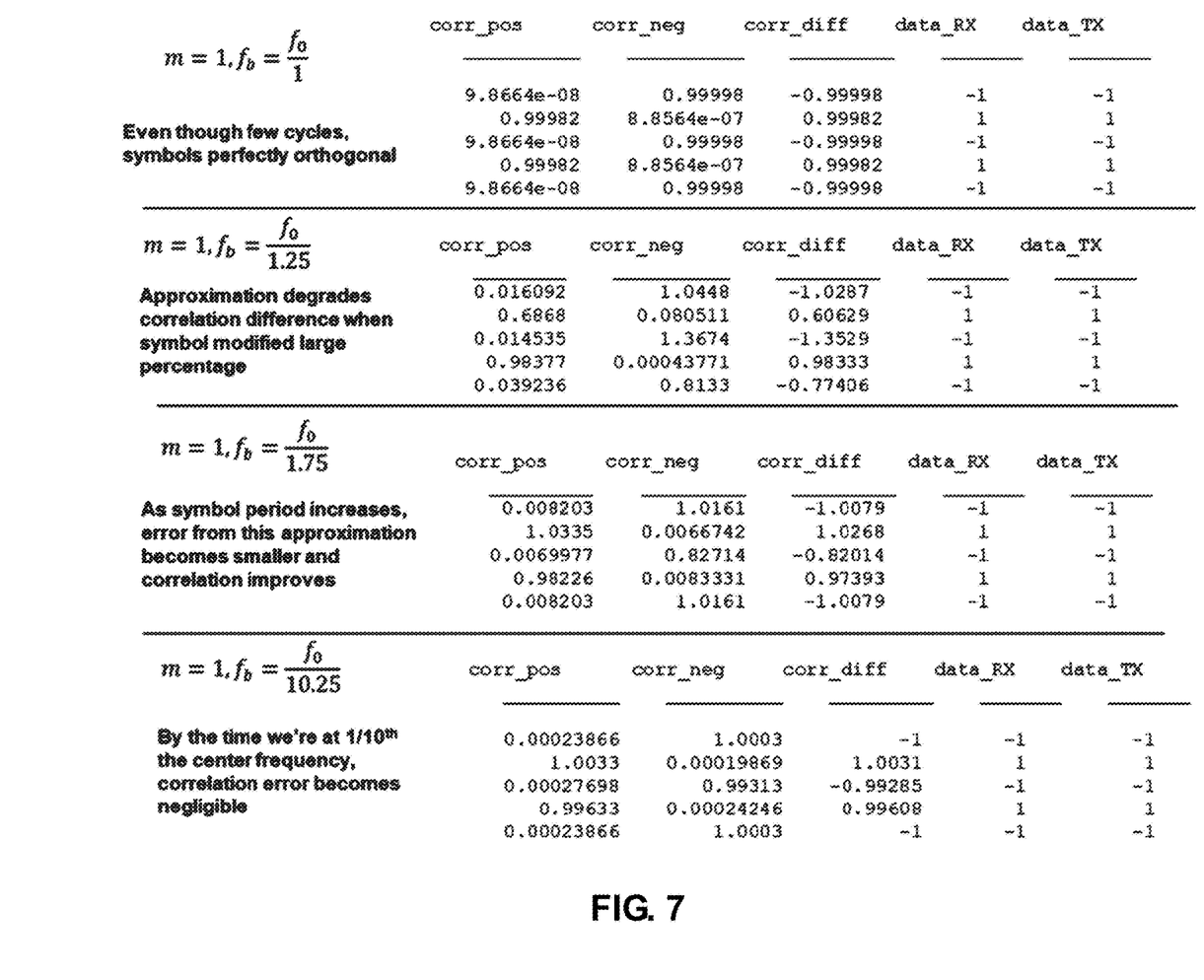
FIG. 7 illustrates the degradation of correlation in a CPFSK scheme according to this presentation.

As illustrated in FIG. 7, the same sequence as in FIG. 6 was evaluated at various bitrates. For $f_b=f_0$ and m=1, (5) applies and the correlation is near perfect. For $f_b=f_0/1.25$, some symbols have weaker correlation because the waveforms change frequency sometimes well into an adjacent symbol period. However, as the bitrate decreases, the correlation becomes near perfect because a very small portion of the bit energy is transmitted at the wrong frequency.

Figure 8:
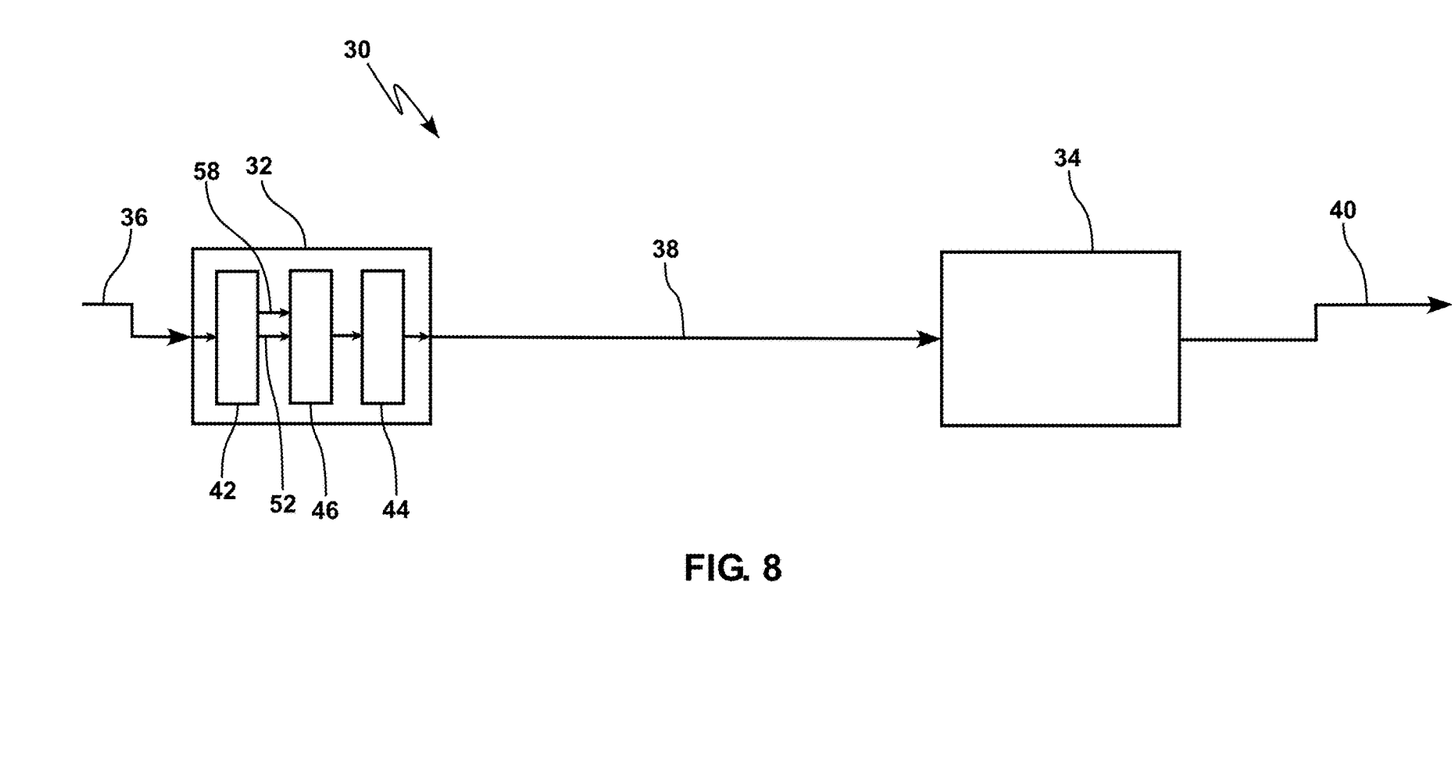
FIG. 8 illustrates a communication link according to embodiments of this presentation.

FIG. 8 illustrates a communication link 30 according to embodiments of this presentation, comprising a transmitter 32 and a receiver 34, respectively provided to transmit and receive an electromagnetic wave such as illustrated in FIG. 4. Transmitter 32 receives as input a bitstream 36 and outputs a corresponding electromagnetic wave 38. Electromagnetic wave 38 can be received by receiver 34, which will output a corresponding bitstream 40. According to an embodiment of this presentation, transmitter 32 comprises a modulator 42 coupled to an antenna 44 by a direct antenna modulator (DAM) circuit 46. The connections of modulator 42 with DAM circuit 46 are detailed hereafter. According to an embodiment, modulator 42 may also comprise amplification.

Figure 9:
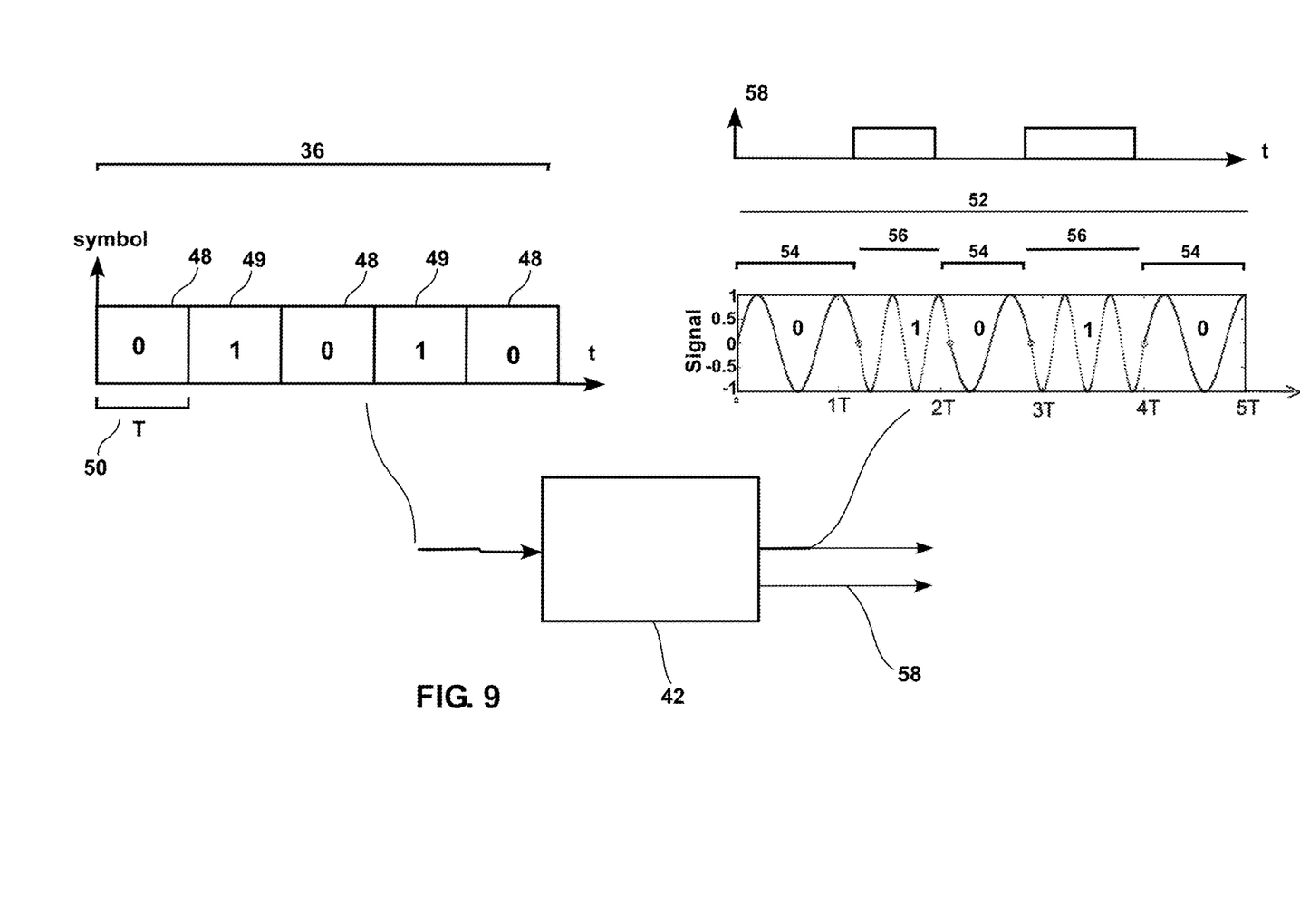
FIG. 9 illustrates the operation of a modulator according to embodiments of this presentation.

FIG. 9 illustrates inputs and outputs of the modulator 42 of FIG. 8. According to embodiments of this presentation, modulator 42 receives as input bitstream 36, which comprises a series of binary symbols 48, 49 with a predetermined repetition period 50 (T). According to embodiments of this presentation, modulator 42 is provided to generate in response to the input bitstream 36 a series 52 of sinusoidal signals comprising in sequence: either a first sinusoidal signal 54 with a first frequency in response to each received binary symbol 48 having a first binary value; or a second sinusoidal signal 56 with a second frequency in response to a received binary symbol 49 having a second binary value. According to embodiments of this presentation, the lowest of the first and second frequencies is larger than or equal to one third the symbol rate (the inverse of repetition period T). Preferably, the lowest of the first and second frequencies is larger than or equal to one half the symbol rate. If the lowest frequency is half the symbol rate then one gets an entire half period within the data period T. However, one can go even lower such that the half period of the lowest frequency goes into the next period T by a little bit. If the frequency is lower than ⅓T, however, then a half period of the lowest frequency would extend over the majority of the next T period and, therefore, would dominate the energy in the next T period. Preferably, the lowest of the first and second frequencies is therefore larger than or equal to one third the symbol rate. As illustrated in FIG. 9, according to embodiments of this presentation, the duration of the sinusoidal signals 54, 56 are shortened or lengthened with respect to the duration T of the binary symbol 48, 49 they respond to, such that each first sinusoidal signal 54 comprises an integer number of half periods of said first frequency and each second sinusoidal signal 56 comprises an integer number of half periods of said second frequency.

According to embodiments of this presentation, modulator 42 is arranged such that the series of sinusoidal signals 52 has a same repetition period as the repetition period 50 (i.e. the number of sinusoidal signals generated per unit of time is equal to the number of received symbols per unit of time). According to embodiments of this presentation, modulator 42 is arranged such that any $n^{th}$ sinusoidal signal of the series 52 of sinusoidal signals 54, 56 is shortened or lengthened to a half period of the frequency of said sinusoidal signal that makes the duration of said $n^{th}$ sinusoidal signal 54, 56 closest to the end time of a series of n times said repetition period 50.

According to embodiments of this presentation, said series of sinusoidal signals follows the function:

$$s(t) = \sin\left[2\pi\left(f_0 + d_n \frac{m}{2T}\right)[t - (n-1)T - \Delta T_{n-1}] + \varphi_{n-1}\right] \quad (6)$$

where t is time, $f_0$ is a carrier frequency of the sinusoidal signals 54, 56, $d_n = \pm 1$ depending on whether the $n^{th}$ binary symbol 48, 49 is a 1 or zero, T is the repetition period 50 of the symbols, m is a modulation index, $\varphi_{n-1}$ is a phase term that ensures continuous phase in case the sinusoidal signal over the symbol period T has a phase progression that is different than an integer multiple of 2*pi, $\Delta T_{n-1}$ is a duration difference between the sinusoidal signal issued in response to the $(n-1)^{th}$ binary symbol and the repetition period T. It follows that in a modulator 42 operating following equation (6) above, the frequency changes at $n*T+\Delta T_n$ instead of changing at periodic times n*T as it would in the known FSK schemes described in relation to FIG. 2.

According to an embodiment of this presentation, modulator 42 is also arranged to output a control signal 58 for controlling the DAM circuit 46 in synchronization with the frequency change of output signal 52. In the embodiment illustrated in FIG. 9, signal 58 has a first value to cause the DAM circuit 46 to controllably resonate antenna 44 at the first frequency and a second value to cause the DAM circuit 46 to controllably resonate antenna 44 at the second frequency. According to embodiments of this presentation, antenna 44 is a capacitive antenna. According to embodiments of this presentation, antenna 44 is a monopole antenna. According to embodiments of this presentation, antenna 44 is a top-loaded monopole antenna. According to embodiments of this presentation, DAM circuit 46 is identical to the DAM circuit illustrated in FIG. 1, and it comprises a first inductor 14 provided to be connected in series with antenna 44 and a second inductor 16, connected in parallel with a control switch 18, in series with said first inductor 14. According to embodiments of this presentation, wherein, the first and second inductors 14, 16 are variable inductors. Embodiments of this presentation also relate to a receiver such as receiver 34 of FIG. 8, provided for receiving and demodulating the signals 38 transmitted by the transmitter 32.

Figure 10:
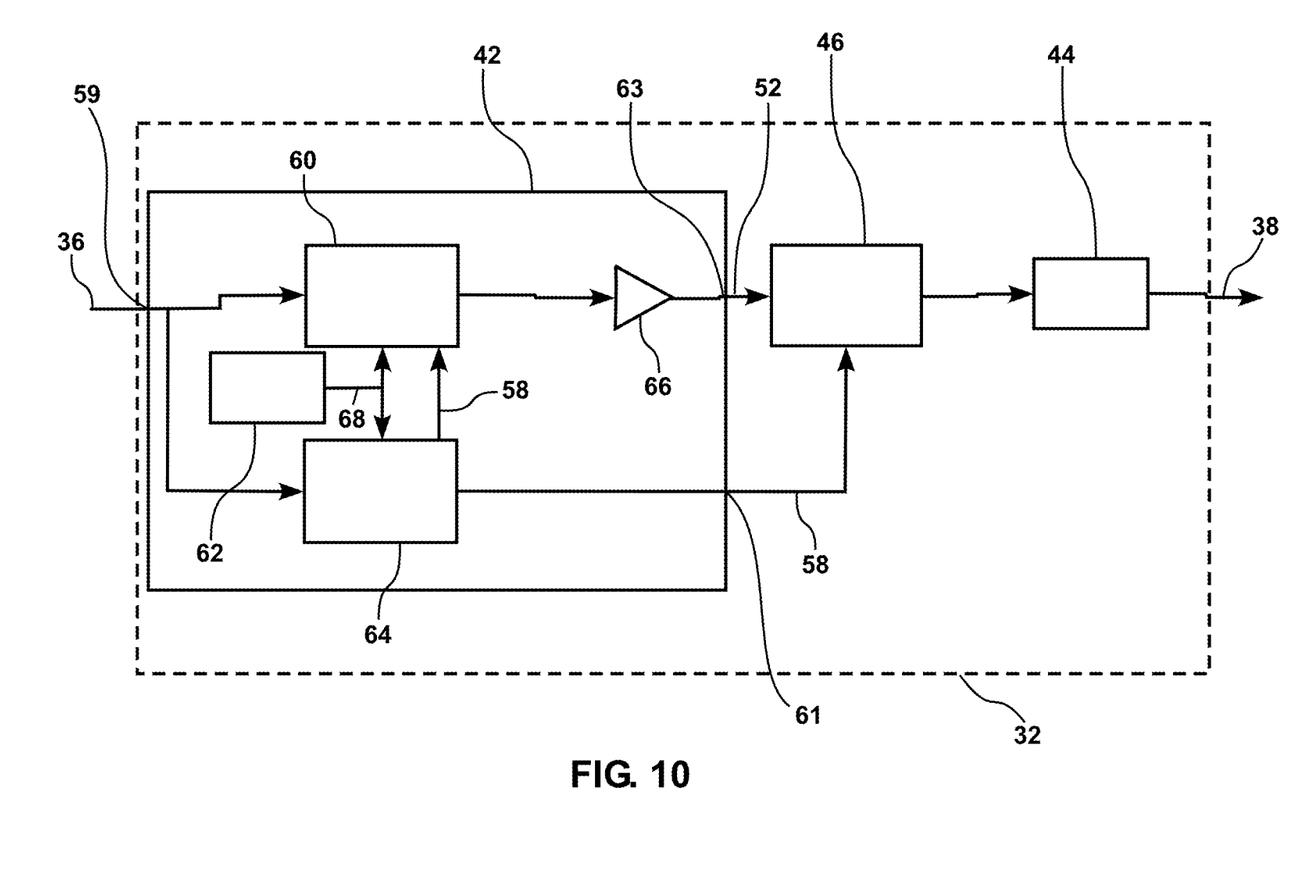
FIG. 10 illustrates a transmitter according to embodiments of this presentation.

FIG. 10 illustrates in detail an embodiment of modulator 42 of transmitter 32. According to embodiments of this presentation, the modulator 42 comprises an input port 59, a Digital Signal Processor (DSP) 60, which can comprise a D/A converter, and also comprises a clock circuit 62 and a controller 64. Preferably, an amplifier 66 can be provided between the output of the DSP 60 and an output port 63 of modulator 42. As illustrated in FIG. 10, both the controller 64 and the DSP 60 receive in input the output 68 of clock circuit 62, which can be the carrier frequency $f_0$ of equation (6) above. Further, DSP 60 and controller 64 both receive in input, on input port 59, the bitstream 36. Controller 64 calculates and outputs on control port 61 the signal 58 to control the DAM circuit 46. According to embodiments of this presentation, control signal 58 is synchronous with changes between sinusoidal signals in said series of sinusoidal signals, and can be provided to DSP 60 to synchronize the frequency changes (or changes between sinusoidal signals) of signal 52 with control signal 58.

Figure 11:
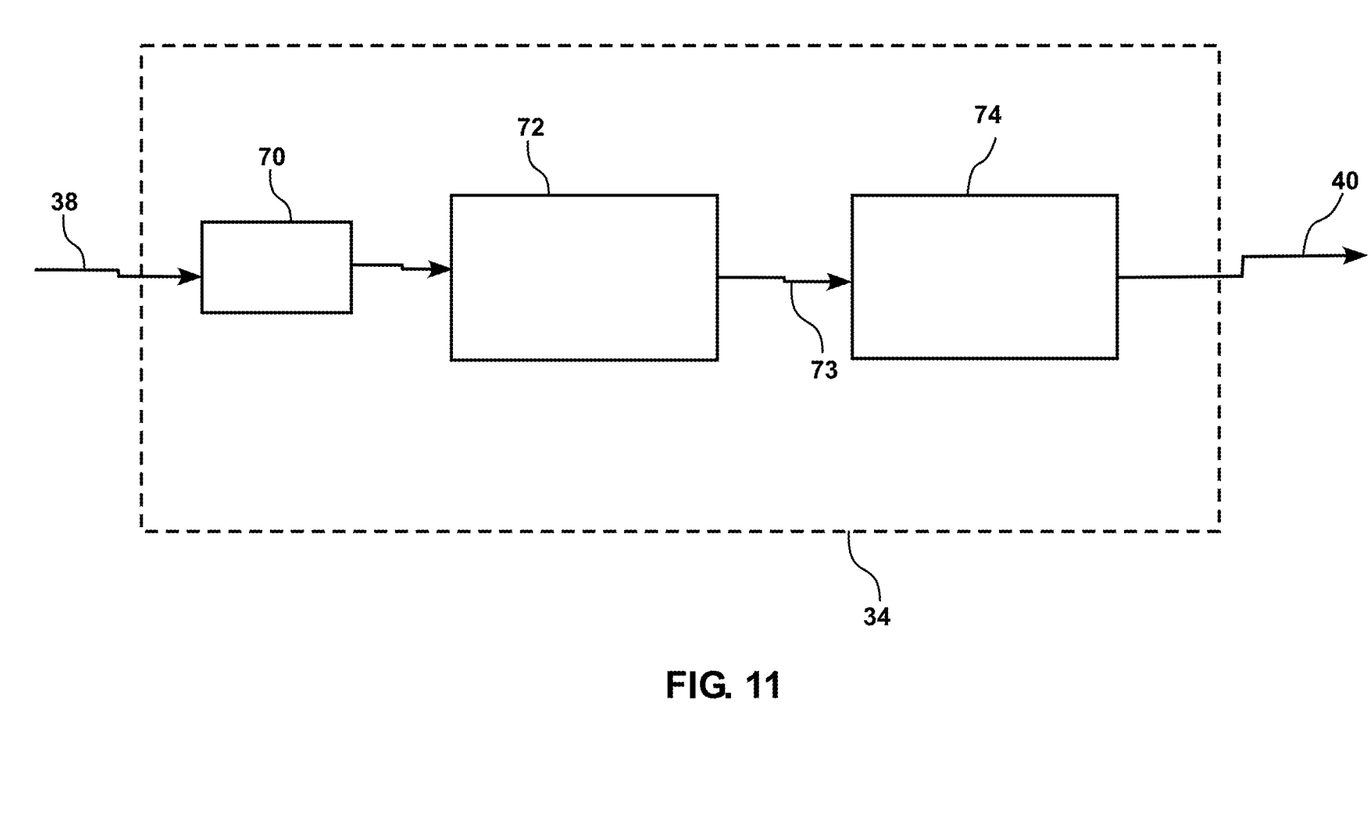
FIG. 11 illustrates a receiver according to embodiments of this presentation.

FIG. 11 illustrates an embodiment of receiver 34 according to embodiments of this presentation, comprising an antenna 70 for receiving the RF waveform 38 and sending it to a RF front end 72. It is noted that the RF front end 72 can, in some embodiments, down-convert the frequency of the received signal 38. Alternatively, in some other embodiments especially at lower frequencies, the RF front end 72 can upconvert or not convert at all the frequency of the received signal 38. The RF front end 72 can comprise a tuning/matching circuit as well as an amplifier and filter where appropriate. The output 73 of the RF front end 72 is coupled to a demodulator 74 according to embodiments of this presentation.

Figure 12:
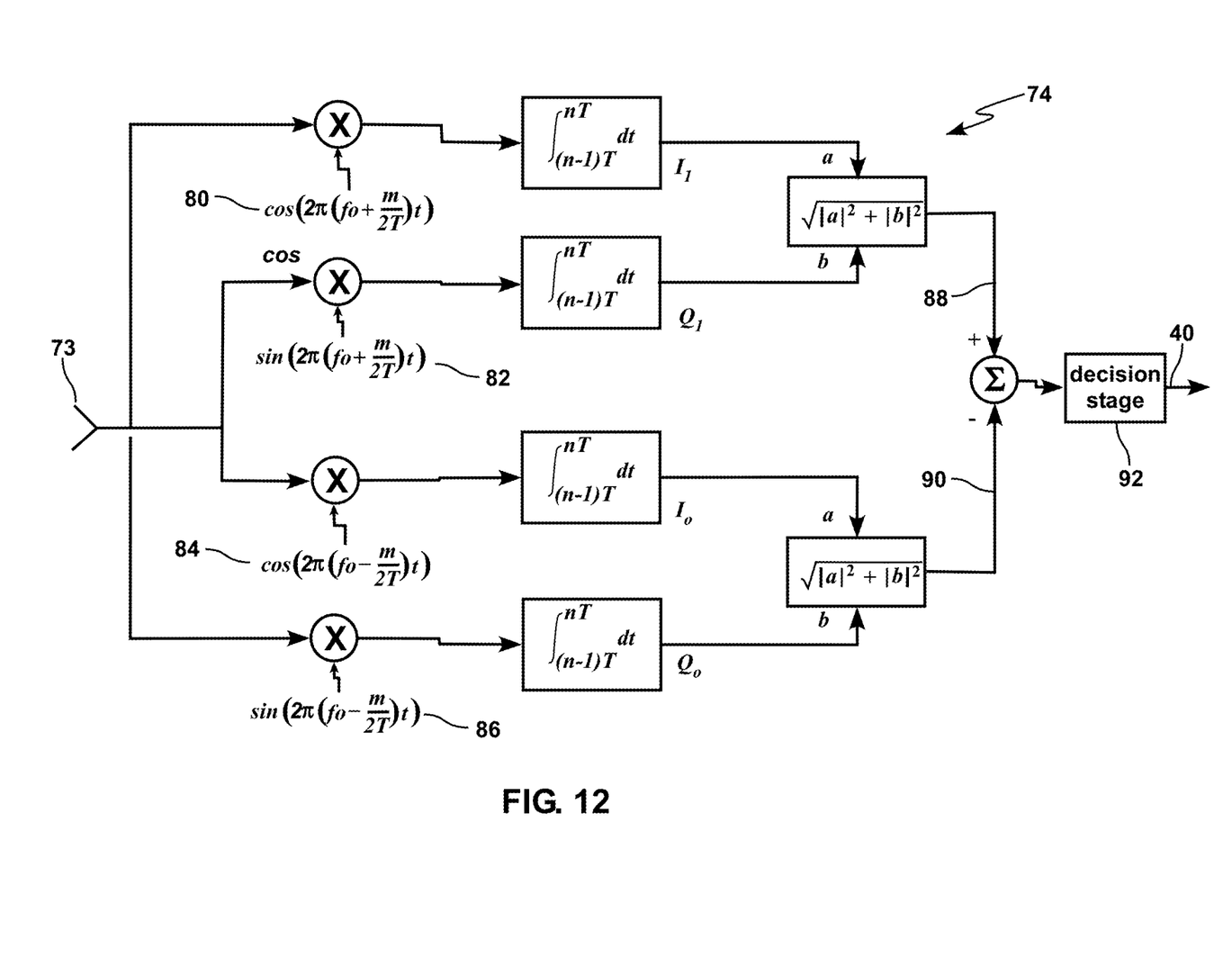
FIG. 12 illustrates a demodulator according to embodiments of this presentation.

FIG. 12 illustrates an embodiment of an incoherent demodulator 74 for an operation where the points t=nT, with n an integer, are known by receiver 34. Demodulator 74 is provided to correlate the input signal 73 over the symbol periods (n−1)*T to n*T with in-phase (80) and quadrature (82) reference signals of the first frequency and in-phase (84) and quadrature (86) reference signals of the second frequency to determine the correlation (88, 90) with the first and second frequencies, and then demodulator 74 is provided to subtract the correlation values and send the subtraction to a decision stage 92 to extract the encoded data 40.

Alternatively, in embodiments where the points t=nT are not known by receiver 34, receiver 34 is provided to synchronize the times at which the bits are determined.

In embodiments where the receiver 34 has knowledge of when the bits change, the integrals, difference and decisions are made every T seconds. According to alternative embodiments, the receiver is provided to continuously calculate the integrals every Δt≪T, which produces a waveform that is at a maximum or minimum at t=n*T. The decision stage then uses this information to find the bit period boundaries.

Figure 13:
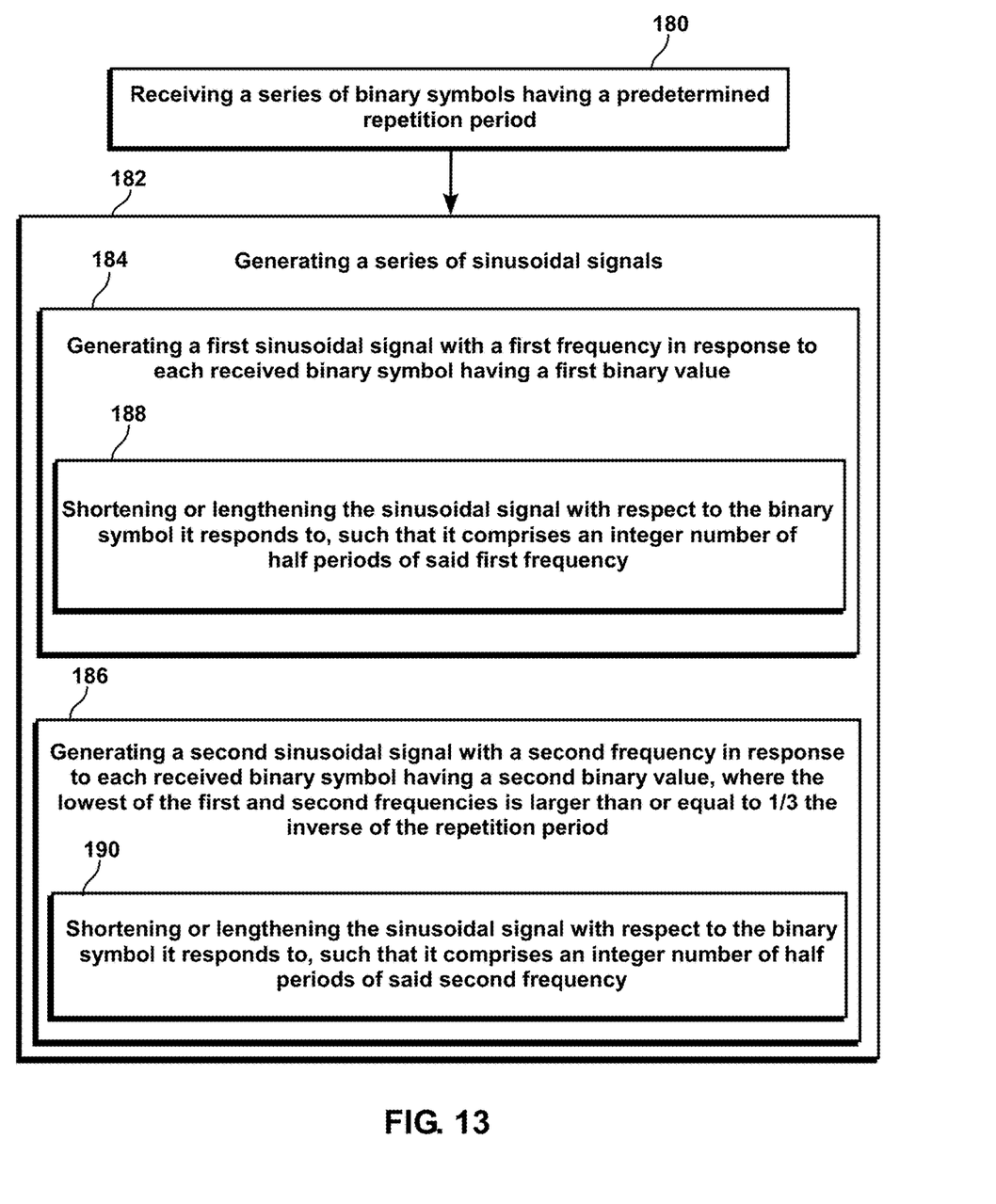
FIG. 13 illustrates a method according to embodiments of this presentation.

FIG. 13 illustrates a method of Continuous Phase Frequency Shift Keying modulation according to embodiments of this presentation, the method comprising: receiving 180 a series of binary symbols having a predetermined repetition period; and generating 182 in response a series of sinusoidal signals. According to embodiments of this presentation, said generating 182 comprises generating 184 a first sinusoidal signal with a first frequency in response to each received binary symbol having a first binary value; and generating 186 a second sinusoidal signal with a second frequency in response to a received binary symbol having a second binary value, where the lowest of the first and second frequencies is larger than or equal to one third the symbol rate. According to embodiments of this presentation, said generating 184 of a first sinusoidal signal is followed by shortening or lengthening 188 the sinusoidal signals with respect to the binary symbol they respond to, such that each first sinusoidal signal comprises an integer number of half periods of said first frequency. According to embodiments of this presentation, said generating 86 of a second sinusoidal signal is followed by shortening or lengthening 190 the sinusoidal signals with respect to the binary symbol they respond to, such that each second sinusoidal signal comprises an integer number of half periods of said second frequency.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

The invention claimed is:

1. A Continuous Phase Frequency Shift Keying modulator comprising
   an input port configured to receive a series of binary symbols having a predetermined repetition period;
   a signal processor configured to generate a series of sinusoidal signals comprising in sequence:
      a first sinusoidal signal with a first frequency in response to each received binary symbol having a first binary value; and
      a second sinusoidal signal with a second frequency in response to a received binary symbol having a second binary value, where the lowest of the first and second frequencies is larger than or equal to one third the symbol rate;
      wherein the sinusoidal signals are shortened or lengthened with respect to the binary symbol they respond to, such that each first sinusoidal signal comprises an integer number of half periods of said first frequency and each second sinusoidal signal comprises an integer number of half periods of said second frequency; and
   an output port configured to output said series of sinusoidal signals.

2. The modulator of claim 1, wherein the lowest of the first and second frequencies is larger than or equal to one half a symbol rate that is the inverse of the repetition period.

3. The modulator of claim 1, wherein each said sinusoidal signal is shortened or lengthened to a half period of the frequency of said sinusoidal signal that makes said sinusoidal signal end closest to an integer multiple of said predetermined repetition period.

4. The modulator of claim 1, wherein said series of sinusoidal signals follows the function:

$$s(t) = \sin\left[2\pi\left(f_0 + d_n \frac{m}{2T}\right)[t - (n-1)T - \Delta T_{n-1}] + \varphi_{n-1}\right]$$

where t is time, $f_0$ is a carrier frequency of the sinusoidal signals, $d_n = \pm 1$ depending on whether the $n^{th}$ binary symbol is a 1 or zero, T is the predetermined repetition period, m is a modulation index, $\varphi_{n-1}$ is a phase term that ensures continuous phase in case the sinusoidal signal over the symbol period T has a phase progression that is different than an integer multiple of 2*pi, $\Delta T_{n-1}$ is a duration difference between the sinusoidal signal issued in response to the $(n-1)^{th}$ binary symbol and the predetermined repetition period.

5. The CPFSK modulator of claim 1, further comprising a controller provided to generate on a control port a control signal synchronous with changes between sinusoidal signals in said series of sinusoidal signals.

6. A transmitter comprising:
the CPFSK modulator of claim 5;
a reactive antenna coupled to said output port by a Direct Antenna Modulator, the Direct Antenna Modulator being further connected to the control port and provided to controllably resonate said antenna at said first and second frequencies in synchronism with the output frequency of said CPFSK modulator.

7. The transmitter of claim 6, wherein said antenna is a capacitive antenna.

8. The transmitter of claim 6, wherein said antenna is one of a monopole antenna and a top-loaded monopole antenna.

9. The transmitter of claim 6, wherein said Direct Antenna Modulator comprises a first inductor in series with said antenna and a second inductor, connected in parallel with a control switch, in series with said first inductor.

10. The transmitter of claim 9, wherein, the first and second inductors are variable inductors.

11. A communications link comprising:
a transmitter according to claim 6; and
a receiver provided for receiving and demodulating the signals transmitted by said transmitter.

12. A Continuous Phase Frequency Shift Keying modulation method comprising:
receiving a series of binary symbols having a predetermined repetition period; and
generating a series of sinusoidal signals comprising in sequence:
a first sinusoidal signal with a first frequency in response to each received binary symbol having a first binary value; and
a second sinusoidal signal with a second frequency in response to a received binary symbol having a second binary value, where the lowest of the first and second frequencies is larger than or equal to one third the symbol rate;
the method comprising shortening or lengthening the sinusoidal signals with respect to the binary symbol they respond to, such that each first sinusoidal signal comprises an integer number of half periods of said first frequency and each second sinusoidal signal comprises an integer number of half periods of said second frequency.

13. The method of claim 12, wherein the lowest of the first and second frequencies is larger than or equal to one half the symbol rate.

14. The method of claim 13, wherein each said sinusoidal signal is shortened or lengthened to a half period of the frequency of said sinusoidal signal that makes said sinusoidal signal end closest to an integer multiple of said predetermined repetition period.

15. The method of claim 12, wherein said series of sinusoidal signals follows the function:

$$s(t) = \sin\left[2\pi\left(f_0 + d_n \frac{m}{2T}\right)[t - (n-1)T - \Delta T_{n-1}] + \varphi_{n-1}\right]$$

where t is time, $f_0$ is a carrier frequency of the sinusoidal signals, $d_n = \pm 1$ depending on whether the $n^{th}$ binary symbol is a 1 or zero, T is the predetermined repetition period, m is a modulation index, $\varphi_{n-1}$ is a phase term that ensures continuous phase in case the sinusoidal signal over the symbol period T has a phase progression that is different than an integer multiple of 2*pi, $\Delta T_{n-1}$ is a duration difference between the sinusoidal signal issued in response to the $(n-1)^{th}$ binary symbol and the predetermined repetition period, According to embodiments of this presentation, in a modulator operating following (6), instead of changing frequencies at periodic times n*T, the frequency changes at $n*T+\Delta T_n$.

16. A method of transmission comprising:
generating a series of sinusoid signals pursuant to the method of claim 12 on an output port of a CPFSK modulator provided to implement said method;
with a Direct Antenna Modulator provided to controllably resonate a reactive antenna coupled to said output port, controllably resonating said antenna at said first and second frequencies in synchronism with the output frequency of said CPFSK modulator.

17. The method of claim 16, wherein said antenna is a capacitive antenna.

18. The method of claim 16, wherein said antenna is one of a monopole antenna and a top-loaded monopole antenna.

19. The method of claim 16, wherein said Direct Antenna Modulator comprises a first inductor in series with said antenna and a second inductor, connected in parallel with a control switch, in series with said first inductor.

20. The method of claim 16, wherein the first and second inductors are variable inductors.

* * * * *